United States Patent [19]

Kinghorn et al.

[11] Patent Number: 5,386,238
[45] Date of Patent: Jan. 31, 1995

[54] COMBINATION TV RECEIVER AND TELETEXT PROCESSOR WITH ON-SCREEN MESSAGE CAPABILITY

[75] Inventors: John R. Kinghorn, Brockenhurst; Jeremy R. Stevens, Lymington; David R. Tarrant, Romsey, all of England

[73] Assignee: U.S. Philips Corporation, New York, N.Y.

[21] Appl. No.: 2,434

[22] Filed: Jan. 8, 1993

[30] Foreign Application Priority Data

Jan. 9, 1992 [GB] United Kingdom ............. 9200426

[51] Int. Cl.⁶ .................. H04N 7/08; H04N 7/087
[52] U.S. Cl. ...................... 348/468; 348/473; 348/563
[58] Field of Search ............... 358/183, 22, 147, 181, 358/142; 340/721; H04N 7/08, 7/087; 348/465, 468, 473, 478; 345/113, 114, 115, 116, 563, 564

[56] References Cited

U.S. PATENT DOCUMENTS

| | | | |
|---|---|---|---|
| 4,435,729 | 3/1984 | Harwood | 358/183 |
| 4,556,904 | 12/1985 | Monat | 348/468 |
| 4,633,297 | 12/1986 | Skerlos et al. | 358/22 |
| 4,677,488 | 6/1987 | Zato | 358/147 |
| 4,684,935 | 8/1987 | Fujsaku et al. | 345/116 |
| 4,991,012 | 2/1991 | Yoshino | 348/565 |
| 5,008,750 | 4/1991 | Gomikawa | 358/147 |
| 5,208,671 | 5/1993 | Tarrant | 358/147 |

FOREIGN PATENT DOCUMENTS

| | | | |
|---|---|---|---|
| 0158767 | 10/1985 | European Pat. Off. | H04M 11/08 |
| 216161 | 4/1987 | European Pat. Off. | 345/116 |
| 0362940 | 11/1990 | European Pat. Off. | H04N 7/087 |
| 0406972 | 1/1991 | European Pat. Off. | H04N 7/087 |
| 0063284 | 3/1990 | Japan | H04N 7/08 |
| 2240447 | 7/1991 | United Kingdom | H04N 5/445 |
| 2244897 | 11/1991 | United Kingdom | H04N 7/00 |

Primary Examiner—James J. Groody
Assistant Examiner—Chris Grant
Attorney, Agent, or Firm—Bernard Franzblau

[57] ABSTRACT

A television receiver includes a teletext decoder having a page memory (PM) into which teletext data is read from a data acquisition circuit (DAC) via an interface circuit (MIC) under control of a microprocessor (PRO). The microprocessor is also used to control functions of the television receiver and to cause on-screen display messages to be produced. When an on-screen display message is to be produced, the microprocessor sets a bit in the memory PM which causes a latch to be set which in turn causes a multiplexer (MUX) to apply data from an auxiliary memory (APM) to a character generator (CG). When the on-screen display message is to be deleted, the bit in the page memory is reset causing the latch to be reset and the multiplexer to apply data from the page memory to the character generator. This enables on-screen display messages to be applied to the character generator without losing any of the teletext data stored in the page memory.

19 Claims, 3 Drawing Sheets

| Column | D7 | D6 | D5 | D4 | D3 | D2 | D1 | D0 |
|---|---|---|---|---|---|---|---|---|
| 10 | — | Bottom A2 | Bottom A1 | Bottom A0 | — | Top A2 | Top A1 | Top A0 |
| 11 | Row 1 N/S | Row 1 A2 | Row 1 A1 | Row 1 A0 | Row 0 N/S | Row 0 A2 | Row 0 A1 | Row 0 A0 |
| 12 | Row 3 N/S | Row 3 A2 | Row 3 A1 | Row 3 A0 | Row 2 N/S | Row 2 A2 | Row 2 A1 | Row 2 A0 |
| 13 | Row 5 N/S | Row 5 A2 | Row 5 A1 | Row 5 A0 | Row 4 N/S | Row 4 A2 | Row 4 A1 | Row 4 A0 |
| 14 | Row 7 N/S | Row 7 A2 | Row 7 A1 | Row 7 A0 | Row 6 N/S | Row 6 A2 | Row 6 A1 | Row 6 A0 |
| 15 | Row 9 N/S | Row 9 A2 | Row 9 A1 | Row 9 A0 | Row 8 N/S | Row 8 A2 | Row 8 A1 | Row 8 A0 |
| 16 | Row 11 N/S | Row 11 A2 | Row 11 A1 | Row 11 A0 | Row 10 N/S | Row 10 A2 | Row 10 A1 | Row 10 A0 |
| 17 | Row 13 N/S | Row 13 A2 | Row 13 A1 | Row 13 A0 | Row 12 N/S | Row 12 A2 | Row 12 A1 | Row 12 A0 |
| 18 | Row 15 N/S | Row 15 A2 | Row 15 A1 | Row 15 A0 | Row 14 N/S | Row 14 A2 | Row 14 A1 | Row 14 A0 |
| 19 | Row 17 N/S | Row 17 A2 | Row 17 A1 | Row 17 A0 | Row 16 N/S | Row 16 A2 | Row 16 A1 | Row 16 A0 |
| 20 | Row 19 N/S | Row 19 A2 | Row 19 A1 | Row 19 A0 | Row 18 N/S | Row 18 A2 | Row 18 A1 | Row 18 A0 |
| 21 | Row 21 N/S | Row 21 A2 | Row 21 A1 | Row 21 A0 | Row 20 N/S | Row 20 A2 | Row 20 A1 | Row 20 A0 |
| 22 | Row 23 N/S | Row 23 A2 | Row 23 A1 | Row 23 A0 | Row 22 N/S | Row 22 A2 | Row 22 A1 | Row 22 A0 |
| 23 | — | — | — | — | Row 24 N/S | Row 24 A2 | Row 24 A1 | Row 24 A0 |

FIG. 2

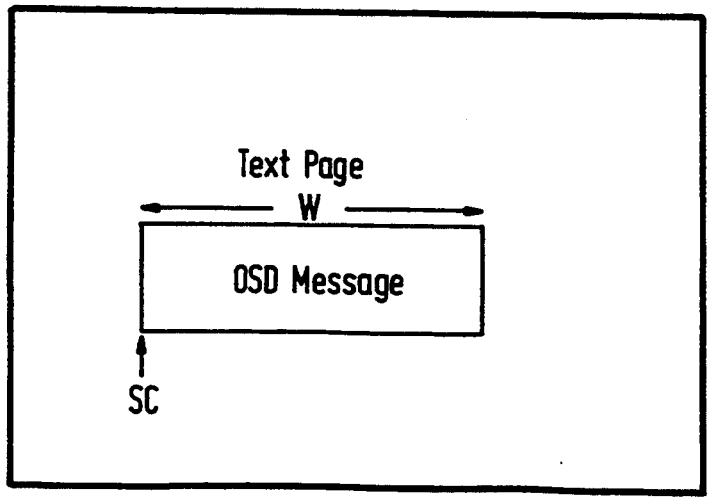

FIG. 4

COMBINATION TV RECEIVER AND TELETEXT PROCESSOR WITH ON-SCREEN MESSAGE CAPABILITY

BACKGROUND OF THE INVENTION

This invention relates to a television receiver including a teletext processor including character generator means and teletext page memory means for receiving, decoding and displaying teletext data, means for generating an on-screen message display, the on-screen message display generating means including a further memory means storing the required data for the on-screen message display, and microprocessor means for controlling the teletext processor and the on-screen message display generating means.

Such a television receiver is disclosed in U.S. Pat. No. 4633297. In the receiver disclosed in this document the on-screen display messages are stored in a read-only memory (ROM) which is read out under control of a microprocessor into the television page memory. Appropriate memory timing and control arrangements select whether the teletext data being received or the stored pages from the on-screen display ROM are written into selected locations of the teletext page memory. Data from the teletext page memory is then fed to a character generator which provides the signal for driving the display device. This arrangement enables on-screen display messages to be overlayed on the teletext data merely by writing on-screen display message data from the ROM into the teletext page memory at the appropriate locations. A disadvantage of the receiver disclosed in U.S. Pat. No. 4,633,297 is that when the on-screen display message is deleted, it will take an indeterminate time for the teletext data to be read into the locations of the memory which had held the on-screen display data, the time depending on the position within the transmitting cycle of the teletext information when the on-screen display message is deleted.

SUMMARY OF THE INVENTION

It is an object of the invention to enable the insertion and deletion of on-screen display messages over a teletext displayed page without an indeterminate delay in restoring the teletext information when the on-screen display information is deleted.

The invention provides a television receiver as set forth in the opening paragraph, characterised by selection means for selectively reading data from the page memory and the further memory to the character generator.

By selectively feeding data from the display memory and the further memory to the character generator, the display of both teletext data and on-screen message display data can be combined on the display screen such that the on-screen message display data overwrites the teletext page data. However, since a full display page of teletext data is retained in the page display memory, the full teletext display data is immediately available as soon as the on-screen message display data is deleted. Consequently, it is not necessary to wait for that position in the cycle of teletext pages where the relevant page information is transmitted to arrive before restoring the teletext display and the on-screen message display can be instantly inserted and deleted without affecting the availability of the teletext data for display.

The selection means may be controlled by data read from given locations of the teletext page memory. This allows a simple latch circuit to control the operation of a multiplexer which selects the output from either the page display memory or the further memory.

BRIEF DESCRIPTION OF THE DRAWINGS

The foregoing and other features and advantages provided by the invention will become apparent from the embodiments of the invention which will now be described, by way of example, with reference to the accompanying drawings, in which:

FIG. 2 shows locations in the page memory where the data selection bits are stored, FIG. 4 shows a teletext display page with an on-screen display message superimposed thereon.

DETAILED DESCRIPTION OF THE PREFERRED EMBODIMENTS

Figure 1:
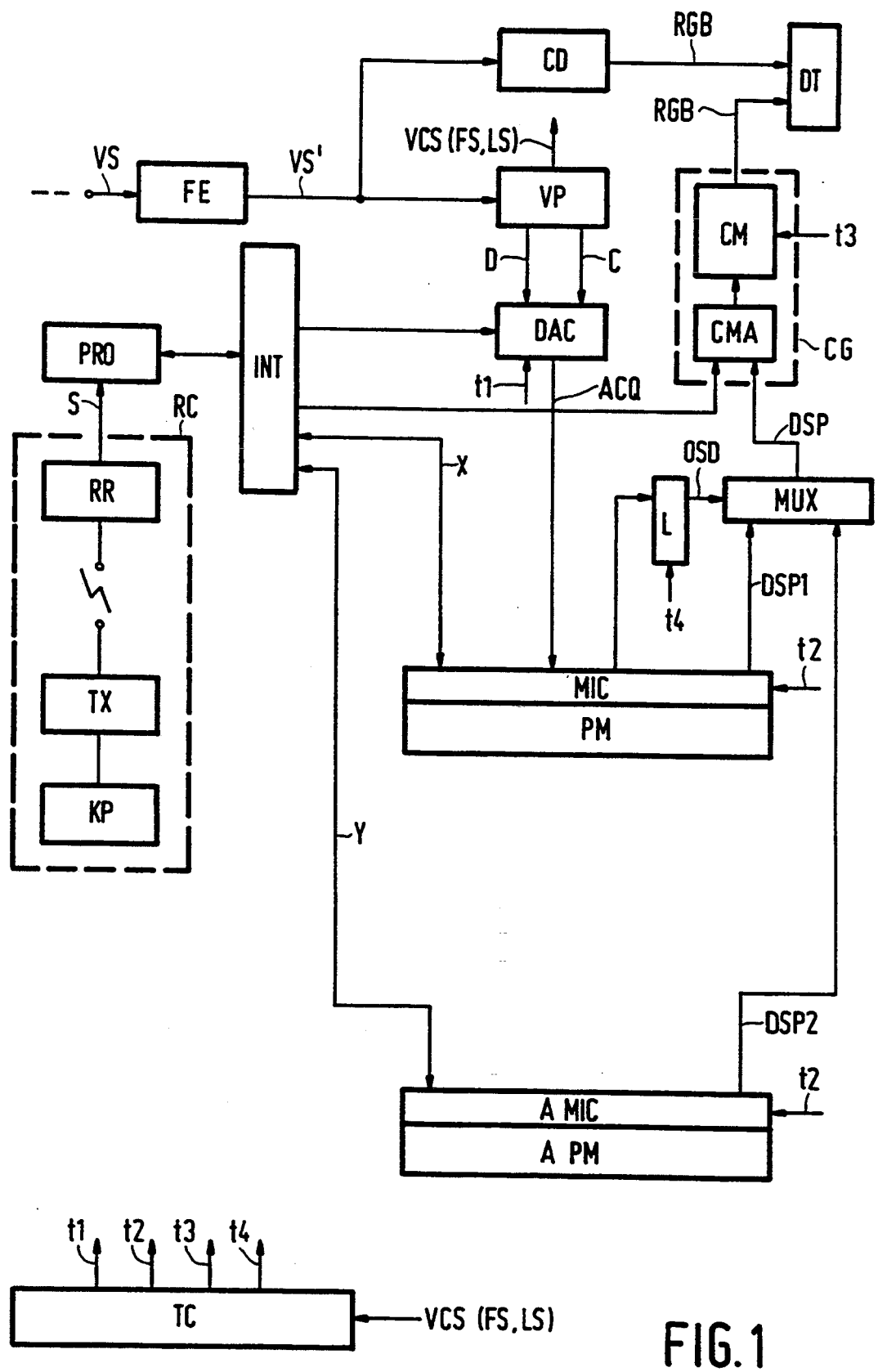
FIG. 1 shows in block schematic form a television receiver according to the invention.

The teletext television receiver shown in FIG. 1 comprises video and data processing circuits for receiving and displaying both normal picture information and teletext information. The front end FE of the receiver comprises conventional amplifying, tuning, intermediate frequency and detector circuits and is connected to receive an incoming video signal VS. For normal picture display by the television receiver the demodulated video signal VS' is applied to a colour decoder CD which produces the RGB component signals for the picture display. Time base circuits for a display device DT, for example a cathode ray tube, receive the usual line and field synchronising pulses from a separator circuit which extracts the synchronising pulses from the video signal VS'. The element CD represents the colour decoder and those other circuits which are provided for normal picture display.

The demodulated video signal VS' is also applied to a teletext decoding section of the television receiver. This section deals with the reception and display of alpha numeric text and other teletext information which is received as digitally coded data. It comprises a video processor circuit VP, a data acquisition circuit DAC, a character generator CG, and a page memory PM. The video processor circuit VP performs, inter alia, data slicing for retrieving teletext data pulses D from the video signal VS' together with input data clock pulses C which are derived from the data pulses D. The data pulses D and clock pulses C are fed to the data acquisition circuit DAC which is operable to feed selected groups of the teletext data pulses over an acquisition connection ACQ to a page memory interface circuit MIC as digital codes representing address, display, and control information. The page memory PM, which has a capacity for storing the display and control information for at least one teletext display page, stores the acquired display and control information as digital codes at respective memory locations as determined by the accompanying address information.

A logic processor PRO controls the operation of the teletext decoder section via a processor interface circuit INT. As part of this control the processor PRO is operable in accordance with a page select signal S applied to it from a receiver circuit RR, which forms part of a remote control arrangement RC, to determine which teletext information is acquired by the data acquisition circuit DAC. The remote control arrangement RC further comprises a key pad KP and a transmitter TX forming the usual remote control unit supplied with many television receivers. The processor PRO is operable to access the page memory PM over a connection X, to read out from the page memory PM the stored digital codes for application via a connection DSP1 and DSP to the character generator CG. The character generator CG is responsive to the applied digital codes to produce RGB component signals for displaying the selected page. The character generator CG comprises character memory CM and an associated addressing circuit CMA. Character information representing the character shapes available for display is stored in the character memory CM which is selectively addressed by addressing circuits CMA in accordance with the digital code applied to the character generator CG from the page memory PM. The character information for each character shape is stored in at least one individual character memory location which is addressable by a respective one of the digital codes. Only a portion of the character information for a character shape is read out at any one time, which portion is displayed in a current scanning line of the display. A timing circuit TC provides timing signals on connections T1 to T3 for the circuit elements DAC CG and MIC. The operation of the timing circuit TC is synchronised with the received video signal VS by a composite signal VCS which contains the line and field synchronising pulses as separated from the demodulated video signal VS' in the video processor VP.

In the teletext television receiver shown in FIG. 1 only single line connections have been shown for the interconnections between the various circuit elements for the sake of simplicity. It will, however, be apparent to a person skilled in the art that in practice many of these interconnections would be multiline. For example, whereas the teletext data pulses D retrieved from the video signal VS' are applied serially to the data acquisition circuit DAC over a single line connection, serial to parallel conversion takes place within the data acquisition circuit DAC so that the connection ACQ is a multiline connection for supplying the groups of teletext data pulses to the page memory PM.

Although a composite television receiver for receiving both normal picture information and teletext information is exemplified in FIG. 1, it will be appreciated that the teletext decoder section for teletext information acquisition together with the front end FE may be provided as a separate teletext decoder which is adapted to feed a display monitor or a conventional television receiver. Alternatively the teletext decoder could be embedded within a video cassette recorder whose output feeds a conventional television receiver.

The teletext receiver as described so far is the same as that described in U.K. patent application No. 2223650 (PHB 33497), which corresponds to U.S. Pat. No. 4,999,706 (Mar. 3, 1991), and for the present purposes it will be assumed that the teletext information to be processed by a teletext decoder embodying the present invention conforms to the specification laid down in the document World System Teletext and Data Broadcasting System, December 1987 published by The U.K. Department of Trade and Industry. In this document a quantity of teletext information to be considered as an entity is termed a page. All the pages which are available are normally transmitted in a recurrent cycle with or without updating page information as appropriate. The pages are numbered and the teletext decoder is operable to select any page by number and the digital codes representing the page information are acquired by the teletext decoder from the cyclic transmission and stored in the page memory for as long as the page is required. The page information comprises digital codes representing display and control information and addresses for up to 24 display rows each having 40 character positions. The first display row, (row 0) of each page is termed a page header and contains, inter alia, the page number. The page information for a page can also include one or more extension data packets which are received and stored in page memory along with the basic display information for the page concerned. Such an extension data packet can, for example, be used to change the character which is to be displayed at a particular character position and in particular may include data from which row attributes which define the background colour for each row to be displayed can be derived.

The page memory PM holds data contained in row 25 of the teletext page. Row 25 is not displayed on the display device but contains a number of control characters. The last 14 columns of row 25 contain the row attributes. These comprise a 3 bit number for each teletext row and the areas at the top and bottom of the screen outside the normal text display area to define the default background colour for the row.

The processor PRO is also arranged to control the receiver and includes in this function the creation of on-screen display messages to indicate to the user the function being controlled. Conventionally the data required to display these on-screen display messages is supplied to the page memory PM over the connection X and is arranged to overwrite the acquired teletext data which was previously present in the page memory PM. This overwriting may be on a row by row basis so that only that portion of the teletext display page which is occupied by the on-screen display message is overwritten. As has been stated hereinbefore, this procedure suffers from the disadvantage that when the on-screen display message is dispensed with (erased) the teletext data which has been overwritten is no longer available and hence display of the full teletext page is not possible until that page is again acquired from the cyclic transmission of teletext data.

The receiver shown in FIG. 1 further comprises a second auxiliary page memory APM which holds the on-screen display information and has associated with it a memory interface circuit AMIC. The processor PRO accesses the memory APM over the connection Y through the interface circuit AMIC to enable the required on-screen display data to be selected and read out at the appropriate times. The memory APM may be either a read only memory programmed with all available on-screen display messages or may be a read/write memory, the on-screen display messages being alterable by the processor PRO. The output DSP2 from the auxiliary page memory APM is fed to a multiplexer MUX whose output provides the signal DSP to the character generator CG. The multiplexer MUX is arranged to select the data for display from either the page memory PM or the auxilliary page memory APM. This is done on the basis of selecting a row for display either from the memory PM or from the memory APM. For each row a bit is stored in the memory PM which specifies whether the row should be displayed from the memory PM or the memory APM. This kit is set by the processor PRO via the connection X. The memory interface circuit MIC applies the bit associated with the row to be displayed to a latch L which is clocked by a signal T4 at the row frequency. The signal T4 is derived from the timing circuit TC. The output OSD of the latch L controls the multiplexer MUX to select the data to be displayed from either the page memory PM or the auxiliary memory APM.

In this way the data which has been acquired by the data acquisition circuit DAC remains stored in the memory PM and the on-screen display information is derived from the auxiliary memory APM and read directly into the character generator through the multiplexer MUX rather than being read into the page memory PM and replacing the teletext data which has previously been acquired. As a result there is no delay in reinstating the teletext data when the on-screen display information is deleted from the display device since the teletext data which has been replaced by the on-screen display data is retained in the memory PM. This is in contrast to the arrangement shown in U.S. Pat. No. 4,633,297 where the on-screen display data is read into the dynamic RAM which forms the page memory and replaces the teletext data. This means that the teletext data where replaced by the on-screen display can only be restored when the cycle of transmitted data returns to the selected page. This may entail a delay of up to 25 seconds before the information is restored and the page can be displayed correctly.

An alternative approach would be to use a single page memory PM but to program the processor to transfer to temporary memory means the teletext data which was to be overwritten by the on-screen display data. This data could then be written back into the page memory PM without having to wait for the appropriate part of the cycle of teletext data transmission. However, this increases the complexity required from the processor and requires it to have a high operating speed. Both of these factors would increase the cost.

Within the page memory PM is data information contained in row 25 of the teletext page. Row 25 is not displayed on the display device but contains a number of control characters. The last 14 characters of row 25 contain the row attributes. These comprise a 3 bit number for each teletext row and the areas at the top and bottom of the screen outside the normal text display area. These 3 bit numbers define the default background colour for the row. In addition they contain a bit for each text row to indicate whether the row should be displayed from the page memory PM or from the auxiliary memory APM. It is this last bit which is set to define from which memory the display is derived for each row. The state of this bit determines whether the latch L becomes set. The state of the output of the latch L causes the multiplexer MIIX to select data from the desired memory. FIG. 2 shows the layout of the memory corresponding to the last 14 columns of row 25 which contains the row attributes. These contain a bit for each text row to indicate whether the rows should be displayed from the normal or the auxiliary memory and a 3 bit number for each teletext row and for the areas at the top and bottom of the screen outside the normal text display area to define the default background colour for that row. Bit $\overline{N}/S$ defines whether text for the row comes from the memory PM or from the auxiliary memory APM. Thus for each row bit N-/S is set to specify the memory from which the data is read out via the multiplexer MUX by the processor PRO over the connection X according to whether teletext data or on-screen display data is to be displayed.

The arrangement shown in FIG. 1 is capable of inserting on-screen display messages from the auxiliary memory APM but is limited to selecting data from the memory PM or from the auxiliary memory APM for a complete row, that is in one display row information from only one of the memories PM and APM can be displayed.

Figure 3:
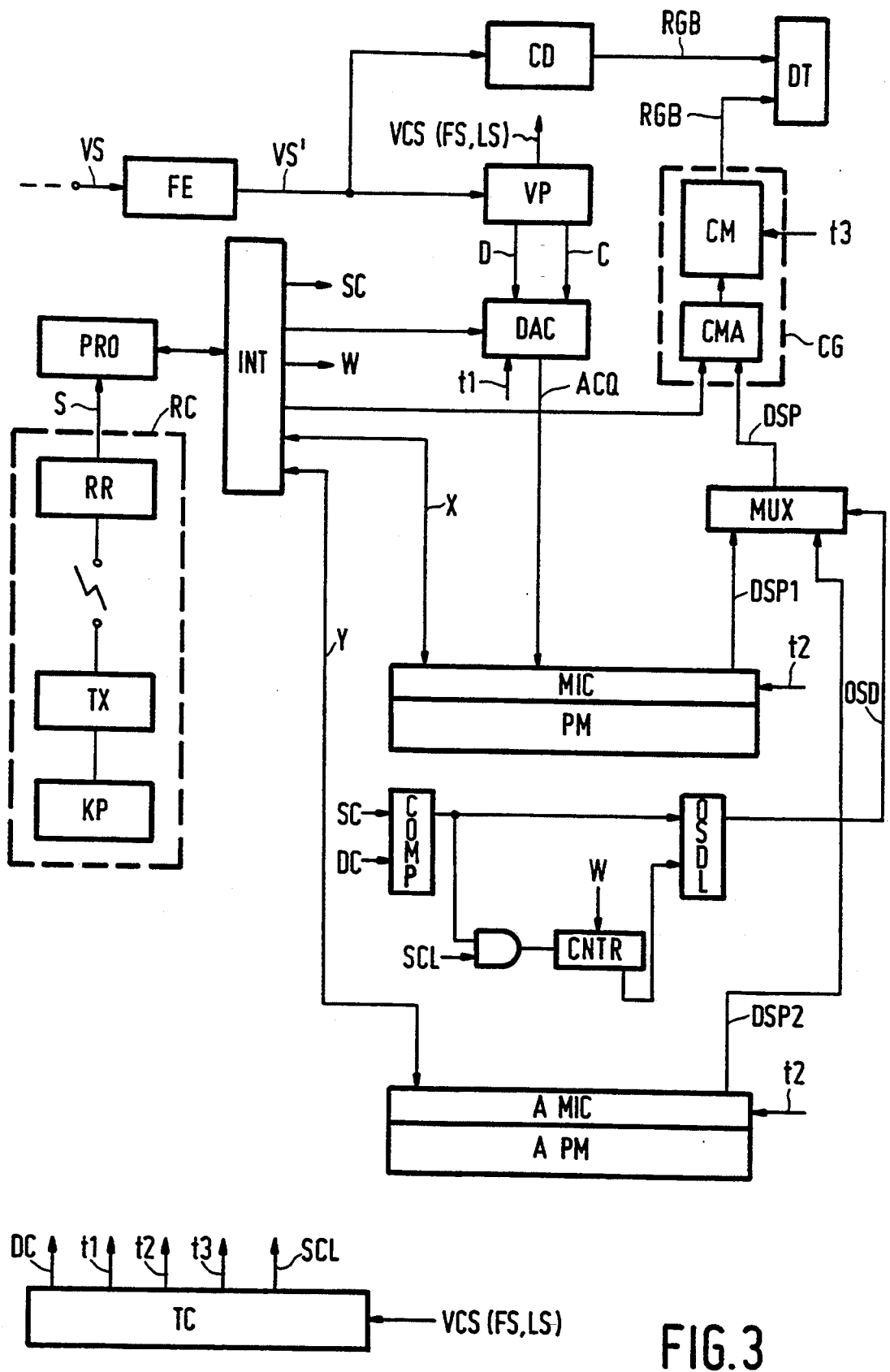
FIG. 3 shows a modification of the television receiver shown in FIG. 1.

FIG. 3 shows an arrangement in which boxed messages as illustrated in FIG. 4 can be displayed, that is the data for display can be taken from both the memory PM and the auxiliary memory APM for the same row.

When an on-screen display is required the processor PRO through the interface unit INT produces a signal SC which is the display character on which the on-screen display message is to start. This is fed to a first input of a comparator COMP. A second input of the comparator COMP receives a signal DC from the timing control circuit TC. When the signal DC, which represents the current display character, is equal to SC, which represents the display character at which the on-screen display is to start, the comparator COMP produces an output which sets a latch OSDL. At the same time it starts a counter CNTR. The processor PRO also produces via the interface INT a signal W which defines the width in character spaces of the area of the screen on which the on-screen display message is to be displayed. This signal W is fed to the counter CNTR to pre-set it to a given count. A clock signal SCL at the character rate is fed to the counter and is enabled by the signal from the comparator COMP. The counter CNTR then counts down to zero when it resets the latch OSDL. The output of the latch OSDL which produces the signal OSD controls the multiplexer MUX. In this way the data for display is selected from either the memory PM or the auxiliary memory APM.

This procedure could of course be replicated so that more than one box is displayed on the screen at any one time, the information being selected from the auxiliary memory APM when the box is defined.

A further refinement of the invention which can be applied to the arrangement shown in FIG. 1 is to allocate a bit in the page memory PM to each character in each row. This will enable either teletext or on-screen display data to be selected on a character by character basis. This will, however, require a greater memory capacity for the page memory PM but will give a greater flexibility of display without requiring significantly greater complexity for the processor PRO.

The arrangements described with respect to the Figures enable the selective display of either teletext data or on-screen display data and enable return to the teletext data without having to re-write the display memory PM. Thus the teletext data is not lost and it is not necessary to wait until the next cycle of transmission of teletext data in order to restore the full page after deleting an on-screen display message.

From reading the present disclosure, other modifications will be apparent to persons skilled in the art. Such modifications may involve other features which are already known in the design and use of television receivers including teletext decoders and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

We claim:

1. A television receiver comprising: a teletext processor including means for receiving, decoding and displaying teletext data, said teletext processor also including a character generator and a teletext page memory, means for generating an on-screen message display, the on-screen message display generating means including a further memory means for storing the required data for the on-screen message display, and microprocessor means for controlling the teletext processor and the on-screen message display generating means, and selection means for selectively reading data from the teletext page memory and the further memory means to the character generator.

2. A television receiver as claimed in claim 1, wherein the selection means is controlled by data read from given locations in the teletext page memory.

3. A television receiver as claimed in claim 2, wherein control data is stored in row 25 of a teletext data page and comprises a single bit for each row of the displayed page and which defines from which memory the data for display should be read.

4. A television receiver as claimed in claim 1 wherein the microprocessor means produces a first signal which defines the column at which an on-screen display message starts and a second signal which defines the width of the on-screen display message.

5. A television receiver as claimed in claim 2 wherein the microprocessor means produces a first signal which defines the column at which an on-screen display message starts and a second signal which defines the width of the on-screen display message.

6. A television receiver as claimed in claim 3 wherein the microprocessor means produces a first signal which defines the column at which an on-screen display message starts and a second signal which defines the width of the on-screen display message.

7. A video system for displaying a TV picture, teletext data and on-screen message data, said system comprising:
means for receiving, separating and processing TV picture signals and teletext data signals, said TV picture signals being applied to a display device and said teletext data signals being stored in a teletext page memory via a data acquisition circuit under control of a microprocessor,
means for generating an on-screen message display wherein the on-screen message display generating means includes an auxiliary page memory for storing on-screen message data encoded in teletext format,
said microprocessor controlling the on-screen message display generating means,
a character generator coupled to said display device, and
a switching device having input means coupled to said teletext page memory and to said auxiliary page memory and an output coupled to said character generator for selectively transferring data from the teletext page memory and the auxiliary page memory to the character generator in different time periods and as a function of a control signal supplied to the switching device, and wherein the data is transferred from the auxiliary page memory to the character generator via said switching device and independently of the teletext page memory.

8. A video system as claimed in claim 7 wherein the switching device is controlled as a function of control data stored in said teletext page memory.

9. A video system as claimed in claim 8 wherein the control data comprises a single digital bit for each row of a page of teletext data to be displayed and which defines which one of the teletext page memory and auxiliary page memory data for display is to be transferred to the character generator.

10. A video system as claimed in claim 8 wherein said control data selectively controls the transfer of data from the teletext page memory and the auxiliary page memory on a row-by-row basis.

11. A video system as claimed in claim 7 wherein said character generator includes a character memory and the on-screen message data is selectively transferred to the character generator via an electric circuit path that excludes the teletext page memory.

12. A video system as claimed in claim 7 wherein said on-screen message display generating means, said character generator, said teletext page memory, said auxiliary page memory and said switching device are part of a teletext processor controlled by said microprocessor.

13. A video system as claimed in claim 7 wherein the switching device is selectively controlled in a manner such that stored data from both the teletext page memory and the auxiliary page memory can be transferred to the character generator and displayed on the display device in a same row of the display.

14. A video system as claimed in claim 7 further comprising a keyboard to provide interactive viewer control of the TV picture, the display of a teletext message and the display of an on-screen message.

15. A television receiver comprising:
means for receiving, processing and displaying TV data on a display device,
a teletext processor means for receiving and decoding teletext data;
a teletext page memory;
a character generator coupled to said display device,
means for generating an on-screen message display, said generating means including a further memory for storing the required data for the on-screen message display;
microprocessor means for controlling the teletext processor means and the on-screen message display generating means;
selection means for selectively reading data from either the teletext page memory or the further memory to the character generator; and
means for supplying characters generated by the character generator to said display device for the display thereof.

16. An apparatus for processing and displaying teletext data and on-screen message data on a display device, said apparatus comprising:
a teletext processor means for receiving and decoding teletext data,
a teletext page memory,
a character generator coupled to said display device, means for storing an on-screen message display including a further memory for storing the required data for the on-screen message display, microprocessor means for controlling the teletext processor means and the on-screen message display storing means, selection means for selectively reading data from either the teletext page memory or the further memory to the character generator in a manner whereby data is transferred from the further memory to the character generator independently of the teletext page memory, and means for supplying characters generated by the character generator to said display device for the display thereof.

17. The apparatus as claimed in claim 16 wherein said microprocessor means controls the teletext page memory, the further memory and the character generator so that the teletext page memory and the further memory time-share the same character generator.

18. A television receiver as claimed in claim 1 wherein said selection means is controlled by control data stored in said teletext page memory and the on-screen message data in said further memory means is selectively supplied to the character generator via a circuit path that includes the selection means but bypasses said teletext page memory.

19. A television receiver as claimed in claim 1 wherein said microprocessor means indirectly controls said selection means such that data in said further memory means is selectively supplied to the character generator via a circuit path that bypasses said teletext page memory.

* * * * *